(12) United States Patent
Klein et al.

(10) Patent No.: US 10,963,889 B2
(45) Date of Patent: Mar. 30, 2021

(54) CROSS-SYSTEM OBJECT TRACKING PLATFORM

(71) Applicant: SAP SE, Walldorf (DE)

(72) Inventors: Udo Klein, Nussloch (DE); Oliver Klemenz, Sinsheim (DE)

(73) Assignee: SAP SE, Walldorf (DE)

( * ) Notice: Subject to any disclaimer, the term of this patent is extended or adjusted under 35 U.S.C. 154(b) by 549 days.

(21) Appl. No.: 15/460,710

(22) Filed: Mar. 16, 2017

(65) Prior Publication Data

US 2018/0268422 A1 Sep. 20, 2018

(51) Int. Cl.
*G06Q 30/00* (2012.01)

(52) U.S. Cl.
CPC ...... *G06Q 30/0185* (2013.01); *H04L 2209/38* (2013.01)

(58) Field of Classification Search
None
See application file for complete search history.

(56) References Cited

U.S. PATENT DOCUMENTS

| 8,015,080 | B2 | 9/2011 | Kerschbaum et al. |
| 8,060,758 | B2 | 11/2011 | Kerschbaum et al. |
| 2011/0295908 | A1 | 12/2011 | To et al. |
| 2015/0113291 | A1 | 4/2015 | Suykerbuyk et al. |
| 2015/0278487 | A1 | 10/2015 | Scott |
| 2016/0098723 | A1* | 4/2016 | Feeney .............. G06Q 20/4016 705/75 |
| 2016/0098730 | A1 | 4/2016 | Feeney |
| 2016/0217436 | A1 | 7/2016 | Brama |
| 2017/0048216 | A1* | 2/2017 | Chow ............... G06Q 20/0655 |
| 2017/0083860 | A1* | 3/2017 | Sriram .................. H04L 63/126 |
| 2017/0126702 | A1* | 5/2017 | Krishnamurthy ..... H04L 63/123 |
| 2018/0082043 | A1* | 3/2018 | Witchey ................. G16H 10/40 |
| 2018/0115538 | A1* | 4/2018 | Blake ...................... H04L 63/10 |
| 2018/0253464 | A1* | 9/2018 | Kohli ................... H04L 9/3236 |
| 2018/0276600 | A1* | 9/2018 | Fuller ..................... G06K 7/12 |

FOREIGN PATENT DOCUMENTS

WO WO-2017027648 A1 * 2/2017 ........... H04L 9/3247

* cited by examiner

*Primary Examiner* — Jamie R Kucab
(74) *Attorney, Agent, or Firm* — Jones Day

(57) ABSTRACT

Integrity of a physical object is verified by receiving, data encapsulating a request to verify the integrity of the physical object. Subsequently, a data structure is accessed that includes a plurality of linked segments each characterizing an entity within a supply chain for the physical object. Each segment includes a respective predecessor field and a respective hash value. All of the segments can be iterated through in reverse chronological order to confirm, for each segment, whether a value for the predecessor field is equal to a hash value in a hash field in an immediately previously segment, the hash value being a hash of all values of the particular segment. Data characterizing the iteration can then be provided. Related apparatus, systems, techniques and articles are also described.

20 Claims, 3 Drawing Sheets

US 10,963,889 B2

CROSS-SYSTEM OBJECT TRACKING PLATFORM

TECHNICAL FIELD

The subject matter described herein relates a cross-system object tracking platform that is used to track the transfer of physical objects to counter fraudulent transfers and counterfeit physical objects.

BACKGROUND

Counterfeiting of manufactured objects remains a significant problem for almost all brand manufacturers and suppliers. Even in the absence of counterfeiting it is often desirable to track high value objects for a variety of reasons including warranty and maintenance. Typical solutions to these challenges are security features that are attached to the object and which are difficult to duplicate. In addition, centralized tracking databases are sometimes implemented which typically require user registration and/or access to a supply chain management (SCM) system.

Buyers typically have no visibility in the history of products shipped to them. Even when centralized tracking databases are used, access to the product tracking information is typically limited to the manufacturer and/or an intermediate distributor.

SUMMARY

In a first aspect, integrity of a physical object is verified by receiving, data encapsulating a request to verify the integrity of the physical object. Subsequently, a data structure is accessed that includes a plurality of linked segments each characterizing an entity within a supply chain for the physical object. Each segment includes a respective predecessor field and a respective hash value. All of the segments can be iterated through in reverse chronological order to confirm, for each segment, whether a value for the predecessor field is equal to a hash value in a hash field in an immediately previously segment, the hash value being a hash of all values of the particular segment. Data characterizing the iteration can then be provided.

The providing data can include at least one of: displaying at least a portion of the data characterizing the iteration in an electronic visual display, transmitting at least a portion of the data characterizing the iteration to a remote computing system, storing at least a portion of the data characterizing the iteration into electronic physical persistence, or loading at least a portion of the data characterizing the iteration into memory.

At least one segment can be signed using a digital authentication certificate associated with the respective entity. With such variations, the iterating can further confirm whether each segment is signed by the respective entity.

Each segment can include an identifier (ID) for the physical object. In some cases, the ID is a globally unique ID (GUID).

Each segment can include a timestamp indicating when it was first generated.

The data structure can be stored in a database. The database can, in some variations, be accessible via a cloud-service.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein.

In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides scalable technical solutions to allow an owner of a product to find out the history of an object without requiring a centralized tracking database nor the setup of such a database. Further, the current subject matter provides a decentralized approach in which certain participants can have access to product tracking information thereby avoiding cases having a central point of failure. In particular, with the current subject matter product tracking happens implicitly and only verification happens explicitly. This arrangement, in turn allows, scaling to much higher volumes as compared to approaches relying on a centralized tracking database.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to cross-object tracking system that provides a secure, authenticated platform for tracking the transfer of physical objects across multiple recipients/touch points. Such platform utilizes a digital object representation that remains associated with the physical object throughout various transfers. This digital object representation identifies the physical object as well as its transfer history (that can identify which entity has handled the physical object). This platform can also selectively hide/obscure data while, at the same time, allowing, when needed, a verification of the integrity of such hidden/obscured data to ensure the authenticity of the physical object.

Figure 1:
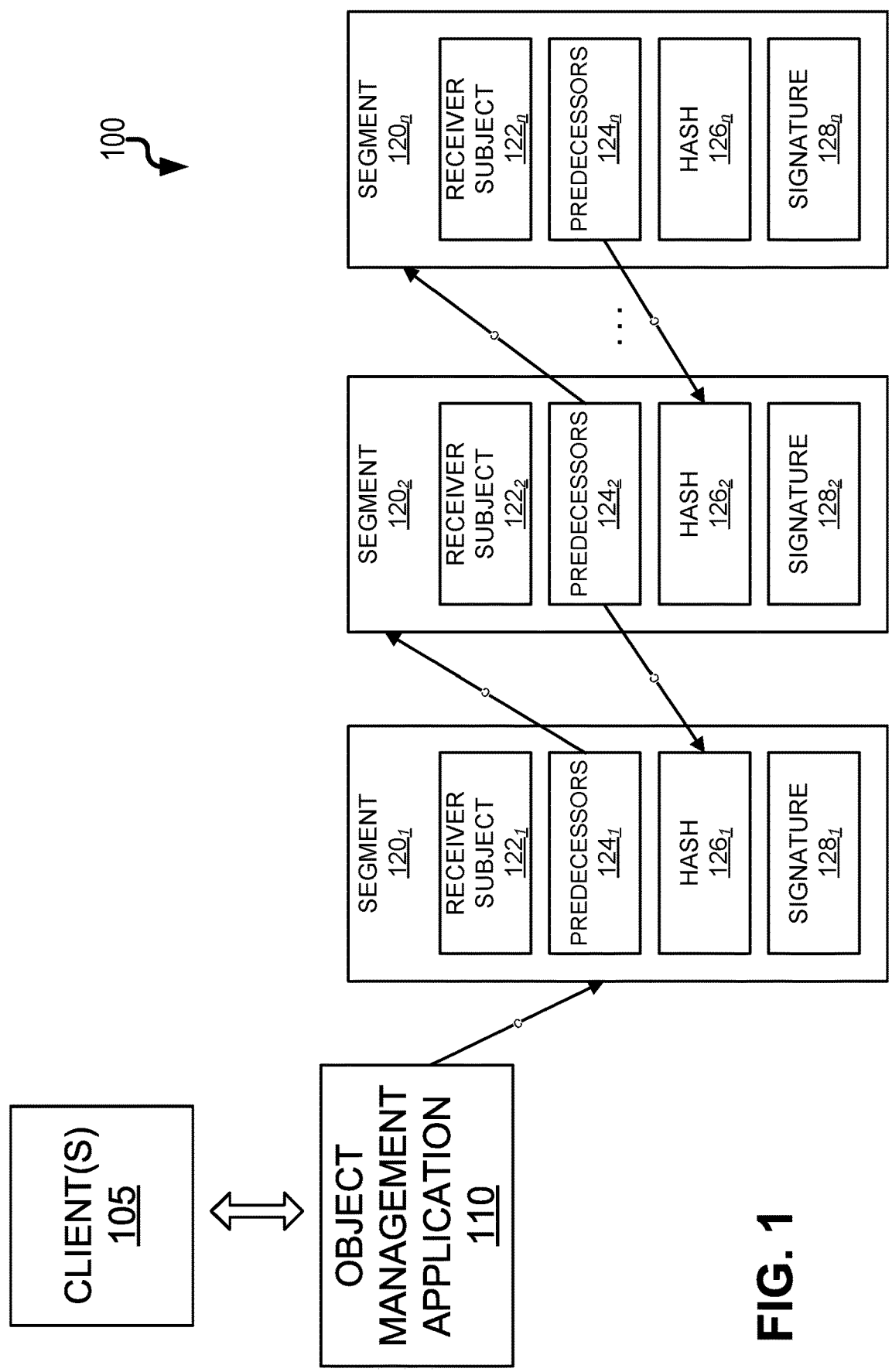
FIG. 1 is a diagram illustrating a computing architecture for implementing a object tracking application.

FIG. 1 is a diagram 100 in which client(s) 105 can access or otherwise interface (i.e., via a directed connection, via a communications network, etc.) with an object management application 110. The client 105 and the object management application 110 can each be computing devices each having memory and one or more processors for executing instructions loaded in the memory. The object management application 105 can determine object status by accessing a data structure (tangibly embodied in a database and/or cloud storage, etc.) plurality of linked segments $120_{1 \ldots n}$ (which, in turn, can be each correspond to a different entity within a supply chain for a particular physical object) forming part of an append only log structure. As will be described in further detail below, each segment $120_{1 \ldots n}$ can be a data structure having, a receiver subject field $122_{1 \ldots n}$, a predecessors field $124_{1 \ldots n}$, a hash $126_{1 \ldots n}$, and a signature $128_{1 \ldots n}$.

All physical objects can be tracked by means of an identifier (ID). This ID can typically be physically attached to the object in a manner that is not easy to manipulate (e.g., stamped, engraved, holograph, etc.). The ID may be a vendor specific ID or a globally unique ID (GUID). The use of GUIDs is advantageous as it can simplify some processing steps; however, the current subject matter is also applicable to vendor specific IDs. The ID of the object is referred to herein as the Object ID (OID). The OID can be assigned by the manufacturer of the object.

Each entity in the supply chain can have an associated authentication certificate such as an x.509 certificate (or similar PKI certificates) that can allow each entity to verify their identity. Also, it is assumed that the entities can sign data with these certificates.

The digital object representation utilized by the object management application 110 is the append only log structure which consists of an initial entry or header that documents the object's creation. In addition it consists of entries which are subsequently appended that document the object's lifecycle.

Table 1 below illustrates an example format of each segment $120_{1 \ldots n}$ while FIG. 1 shows an alternative arrangement show one set of fields that that be utilized.

TABLE 1

| Field Name | Comment |
| --- | --- |
| segment_type_id | ID of the segment type |
| segment_id | Unique ID of the segment |
| segment_scheme_id | ID of the segment scheme, may also be used for versioning of the scheme |
| object_id (optional) | ID of the object |
| Container | Segment type specific data structure |
| external_hash (optional) | Hash of (private) external data |
| utc_time (optional) | UTC Timestamp |
| receiver_subject (optional) | x.509 subject of the object receiver |
| Predecessors | Array of hash values of direct predecessors |
| Hash | Hash value of the segement's content |
| signature (optional) | x.509 signature of the data above |

Notice that segment and header formats are almost identical. The difference stems from the fact that the header must establish the object type and id. Besides that the mechanics of the header and the segments is basically the same.

The sematics of the fields can be as follows:

segment_type_id: used to describe the type of the segment $120_{1 \ldots n}$. In case of the first segment $120_1$ ("header"), the field also defines the type of the object. The segment_type together with the segment_scheme can also define the format and semantics of the container.

segment_scheme_id: used to describe which scheme is used for the header or segment $120_{1 \ldots n}$. This is particulary useful for versioning/introducing new schemes.

segment_id: the id of the segment $120_{1 \ldots n}$.

receiver_subject: the receiver subject $122_{1 \ldots n}$, is needed for objects/records that are transmitted to other companies. It ensures that it will be possible to verify that the sender actually intended the receiver as stated in the record.

object_id: the unique identifier of the physical object. This may be empty for all segments. If it is empty for the first segment (the header) then the object_id is assumed to equal the hash $126_1$ of the first segment. If the object_id is empty in subsequent segments it is assumed to be equal to the object_id of the latest segment that has a valid object_id (e.g. the hash $126_1$ of the first segment). For performance reasons the object_id may be stored here redundantly. If the object_id is present but does not equal the latest object_id this identifies that a new object was created out of the objects described in the predecessors array. If the array is empty this identifies that a new object was created out of the object described in the previous segment. If the object_id is empty or equals a predecessor object_id this indicates that the object is still the same entitiy.

container: the container may contain any data values. Its scheme and semantics are defined by the segment_type and segment_scheme.

external_hash: a hash value of (private) external data. This is useful if there is data that must not be publicly revealed but which may require a proof of integrity at a later point in time.

utc_timestamp: describes when the segment was written.

receiver_subject: this field may be omitted if the segment is used during in house processing. It is required if integrity of the object's history must be verifiable and the physical object is handed over to a different entity. It describes to whom the object will be sent/shipped.

predecessors: this refers to the hash values of the directly preceding segments $120_{n-1}$. For the first segment $120_1$, this value is empty. For subsequent segments the predecessor $124_{1 \ldots n}$ will usually contain the hash of the direct predecessor in the chain of segment $120_{1 \ldots n}$. It may contain more than one predecessor hashes though. This is useful if a new object is created by combining existing objects into one.

hash: hash value of the previous segment content $126_1$. In case of subsequent segments the hash $126_{1 \ldots n}$ will also consider the hash of the preceding segment $120_{n-1}$. This field is useful for integrity checking of the data.

signature: this field may be omitted if the segment $120_{1 \ldots n}$ is used during in-house processing. It is mandatory if integrity of the object's history must be verifiable and the object is handed over to a different entity. It signs the hash value. Authenticity of the data can only be ensured if the hash is signed.

The append only log structure of the segments $120_{1 \ldots n}$ can be characterizing as establishes a hash chain. That is, each segment $120_{1 \ldots n}$ holds hashes of its predecessors to checking overall integrity of each segment $120_{1 \ldots n}$. The hash values are then compared to the values stored in the successors. If there is a mismatch the integrity check fails. If it does not (yet) fail then the signatures of the segments are checked. For checking the signatures of the (public) certificates of the signers are sufficient.

It is a requirement to verify that the receiver certificate matches the receiver encoded in the preceding segment. In case some segments $120_{1 \ldots n}$ omit the signature, the following exception case processing can be applied:

The certificate must match the receiver encoded in the latest preceding segment that actually encodes a receiver and the (receiver) segment $120_{1 \ldots n}$ must contain valid hashes of all the preceding segments $120_{1 \ldots n}$ that were not previously signed. Otherwise, the integrity check is assumed to fail. This is mainly useful for in-house processing in which the sender and receiver are mutually trusted.

If a signature check fails, then the integrity check fails as well. If the signature check is passed then the validity of the certificate of the latest segment. If this is valid then the overall integrity check is considered successful.

Notice that this check does not require that all certificates are still in their respective validity period. It is sufficient for the latest certificate to be still valid. This caters for the fact that certificates will eventually expire. If the latest certificate is going to expire, this mechanism allows for the extension of the validity period of the overall segment chain.

With reference again to FIG. 1, segment $120_1$ can refer to a manufacturer, segment $120_2$ can refer to a first distributor, and segment $120n$ can refer to a third distributor (and for this example segment $120_n$ can be segment $120_3$). Suppose a product was manufactured and then shipped via first distributor segment $120_2$ to second distributor segment $120_3$. In this scenario, the second distributor does not yet know the next receiver subject.

The second distributor has two possible solutions for this issue (both are admissible). The second distributor may alter segment $120_3$ upon shipment to the next receiver. This is possible because the second distributor can re-sign the segment $120_3$ as often as it wishes. Alternatively, the second distributor may itself as the receiver_subject and add another segment $120_4$ upon shipment. Finally, the second distributor may leave the receiver_subject empty and create subsequent segments $120_{3 \ldots n}$ with empty receiver_subject. Eventually the second distributor will create a segment $120_n$ with references to all the new segments $120_n$ as predecessor and ship the object to a new recipient.

The main route to circumvent the techniques described herein is for a counterfeiter to replicate the segment trail of a product. Having a second look at the illustration of FIG. 1, with manufacturer→first distributor→second distributor. Suppose the first distributor is actually a counterfeiter. In order to pass the integrity check at segment $120_3$ corresponding to the second distributor, the counterfeiter must make up a valid segment chain. In particular, the predecessor of segment $120_2$ must be signed from the manufacturer and point to first distributor as the receiver_subject.

How can the first distributor get such a segment chain? The only way to get such a segment from the manufacturer is to actually buy a product from the manufacturer. However, the first distributor need not sell this product to the second distributor. Instead, the first distributor can sell copies of the product to several different distributors extending the same segment 120 over and over again. As long as the segment is not reused with the same receiver_subject this will go unnoticed by the second distributor.

However as soon as some of the counterfeited products are found in the marketplace then it is clear who shipped which product to whom. So it is clear that the manufacturer, first distributor or the second distributor must have introduced the counterfeited object. As soon as a as the original product or a second counterfeited instance with the same initial chain pops up things become obvious immediately. The duplicate will also have chain that points to distributor_1 as the receiver subject and then deviates. This gives strong evidence that distributor_1 or the manufacturer introduced the duplicate.

There are several ways to detect counterfeits. Typically any product will eventually produce warranty requests by some customers. Hence sooner or later the manufacturer of the original will receive counterfeits including the segment chain. In particular the manufacturer can thus establish a tracking database feeding it with the segments of the returned products. This allows for the detection of some of the duplicates detect some of the duplicates and thus eventually to figure out who the counterfeiter is.

Figure 2:
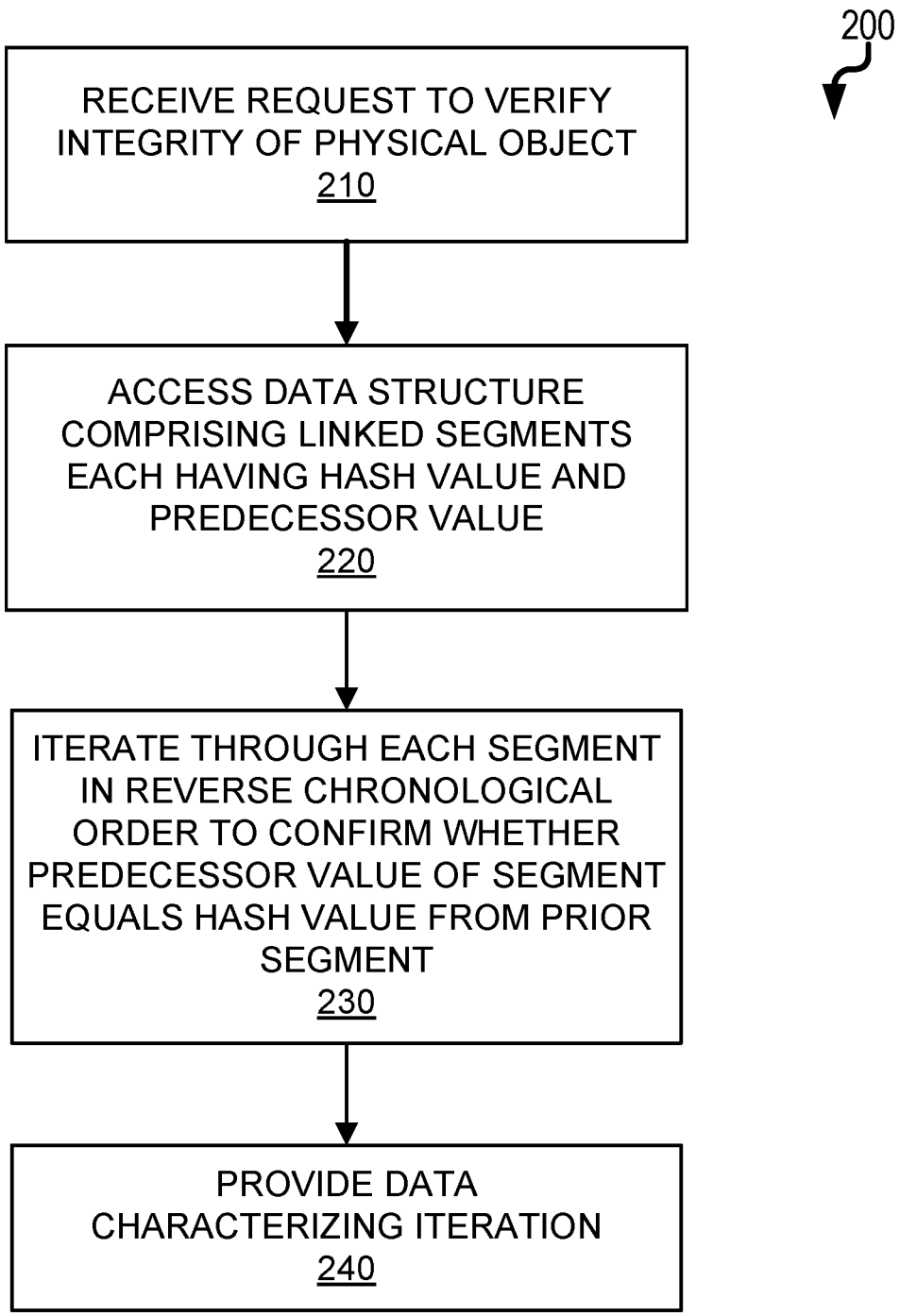
FIG. 2 is a process flow diagram illustrating object tracking.

FIG. 2 is a process flow diagram 200 to verify integrity of a physical object in which, at 210, data encapsulating a request to verify the integrity of the physical object is received. Thereafter, at 220, a data structure is accessed which comprises a plurality of linked segments each characterizing an entity within a supply chain for the physical object. Each segment has a respective predecessor field and a respective hash value. Using the data structure, at 230, all of the segments are iterated through in reverse chronological order to confirm, for each segment, whether a value for the predecessor field is equal to a hash value in a hash field in an immediately previously segment, the hash value being a hash of all values of the particular segment. Data is then provided, at 240, which characterizes the iteration. Providing in this context can include displaying the data in an electronic visual display, loading the data into memory, storing the data into electronic physical persistence, or transmitting the data to a remote computing system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 3:
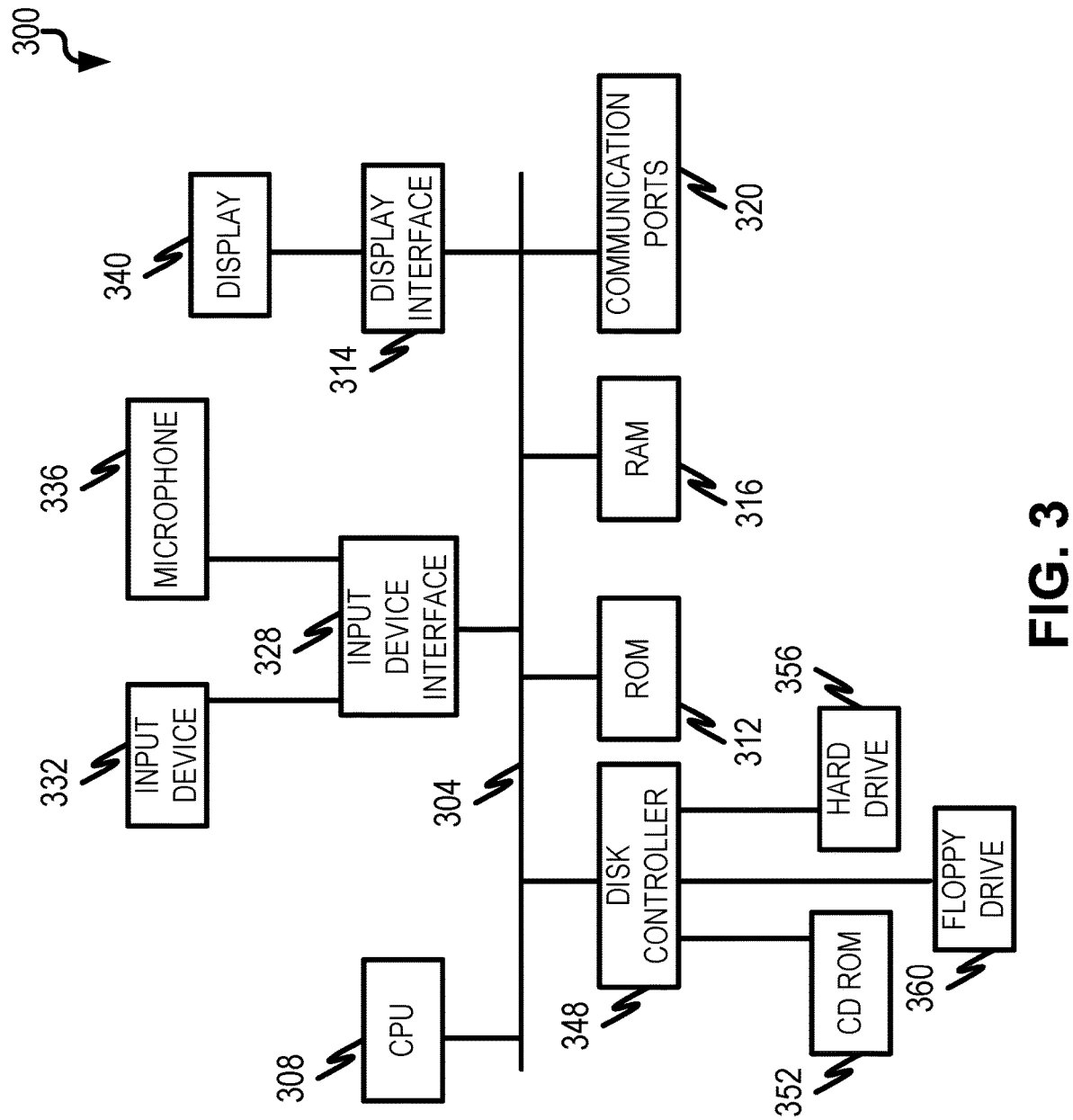
FIG. 3 is a logic diagram illustrating a computing device for implementing aspects of the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. In the input device 332 and the microphone 336 can be coupled to and convey information via the bus 304 by way of an input device interface 328. Other computing devices, such as dedicated servers, can omit one or more of the display 340 and display interface 324, the input device 332, the microphone 336, and input device interface 328.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. For example, the current subject matter is applicable to the storage or other access of data via a cloud-based data storage service. The current subject matter is also applicable to the consumption of utilities such as electricity (e.g., use of an electric vehicle charging station by a subscription holder, etc.). In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method to verify integrity of a physical object comprising:
receiving, by an object management application, data encapsulating a request to verify the integrity of the physical object;
accessing, by the object management application, a data structure comprising a plurality of linked segments including a first segment, a last segment, and at least one segment intermediate the first segment and the last segment, each linked segment other than the last segment characterizing a different entity within a supply chain for the physical object, wherein each segment other than the last segment comprises a respective predecessor field and a hash field having a respective hash value;
iterating, by the object management application, through all of the segments in reverse chronological order;
confirming, by the object management application based on the iterating and for each segment other than the first segment, whether a value for the predecessor field is equal to a hash value in a hash field in an immediately previous segment, the hash value being a hash of all values for all fields of the particular segment other than the hash value;

providing, by the object management application, data indicating that the physical object is authentic when it is confirmed that the value for the predecessor field for all of the segments other than the first segment are equal to the hash value in a hash field in an immediately previous segment; and providing, by the object management application, data indicating that the physical object is counterfeit when it is confirmed that the value for the predecessor field for one or more of the segments other than the first segment are not equal to the hash value in a hash field in an immediately previous segment;

wherein segments other than the last segment include an entity field identifying the entity corresponding to such segment and a receiver field indicating an intended recipient of the physical object within the supply chain and the iterating further comprises confirming for each segment other than the first segment that the receiver fields match an entity field in an immediately preceding segment.

2. The method of claim 1, wherein the providing data comprises at least one of: displaying at least a portion of the data characterizing the iteration in an electronic visual display, transmitting at least a portion of the data characterizing the iteration to a remote computing system, storing at least a portion of the data characterizing the iteration into electronic physical persistence, or loading at least a portion of the data characterizing the iteration into memory.

3. The method of claim 1 further comprising: signing at least one segment using a digital authentication certificate associated with the respective entity.

4. The method of claim 3, wherein the iterating further confirms whether each segment is signed by the respective entity.

5. The method of claim 1, wherein each segment comprises an identifier (ID) for the physical object.

6. The method of claim 5, wherein the ID is a globally unique ID (GUID).

7. The method of claim 1, wherein each segment comprises a timestamp indicating when it was first generated.

8. The method of claim 1, wherein the data structure is stored in a database and wherein each segment comprises a plurality of fields consisting of:
the predecessor field;
the signature field;
the hash field;
a segment type ID providing an identification of a type for the corresponding segment;
a segment ID providing an identification for the corresponding segment;
a segment scheme ID providing a description of which scheme is being used;
the receiver field;
an object ID providing a unique ID for the physical object; and
the entity field.

9. The method of claim 8, wherein the database is accessible via a cloud-service.

10. A system to verify integrity of a physical object comprising:
at least one data processor; and
memory storing instructions which, when executed by the at least one data processor, result in operations comprising:
receiving data encapsulating a request to verify the integrity of the physical object;
accessing a data structure comprising a plurality of linked segments each characterizing a different entity within a supply chain for the physical object, wherein each segment comprises a respective predecessor field and a hash field having a respective hash value;
iterating through all of the segments in reverse chronological order;
confirming, for each segment based on the iterating, whether a value for the predecessor field is equal to a hash value in a hash field in an immediately previous segment, the hash value being a hash of all values for all fields of the particular segment other than the hash value; and
providing data indicating that the physical object is authentic when it is confirmed that the value for the predecessor field for all of the segments other than the first segment are equal to the hash value in a hash field in an immediately previous segment; and
providing data indicating that the physical object is counterfeit when it is confirmed that the value for the predecessor field for one or more of the segments other than the first segment are not equal to the hash value in a hash field in an immediately previous segment;
wherein segments other than the last segment include an entity field identifying the entity corresponding to such segment and a receiver field indicating an intended recipient of the physical object within the supply chain and the iterating further comprises confirming for each segment other than the first segment that the receiver fields match an entity field in an immediately preceding segment.

11. The system of claim 10, wherein the providing data comprises at least one of: displaying at least a portion of the data characterizing the iteration in an electronic visual display, transmitting at least a portion of the data characterizing the iteration to a remote computing system, storing at least a portion of the data characterizing the iteration into electronic physical persistence, or loading at least a portion of the data characterizing the iteration into memory.

12. The system of claim 10, wherein the operations further comprise:
signing at least one segment using a digital authentication certificate associated with the respective entity.

13. The system of claim 12, wherein the iterating further confirms whether each segment is signed by the respective entity.

14. The system of claim 10, wherein each segment comprises an identifier (ID) for the physical object.

15. The system of claim 14, wherein the ID is a globally unique ID (GUID).

16. The system of claim 10, wherein each segment comprises a timestamp indicating when it was first generated.

17. The system of claim 10, wherein the data structure is stored in a database.

18. The system of claim 17, wherein the database is accessible via a cloud-service.

19. A program product to verify integrity of a physical object comprising non-transitory storage media storing instructions which, when executed by at least one data processor forming part of at least one computing device, result in operations comprising:
receiving data encapsulating a request to verify the integrity of the physical object;
accessing a data structure comprising a plurality of linked segments each characterizing a different entity within a supply chain for the physical object, wherein each segment comprises a respective predecessor field, a hash field having a respective hash value, and a signature field;

iterating through all of the segments in reverse chronological order;

performing, for each segment, an integrity check by confirming whether a value for the predecessor field is equal to a hash value in a hash field in an immediately previous segment, the hash value being a hash of all values for all fields of the particular segment other than the hash value;

performing, for each segment, a signature check by comparing a value in the signature field with a publically available signature; and providing data indicating that the physical object is authentic if both the integrity check and the signature check are passed, and providing data indicating that the physical object is counterfeit if one or both the integrity check and the signature check are not passed;

wherein:
each segment comprises a plurality of fields consisting of:
the predecessor field;
the signature field;
the hash field;
a segment type ID providing an identification of a type for the corresponding segment;
a segment ID providing an identification for the corresponding segment;
a segment scheme ID providing a description of which scheme is being used;
a receiver field identifying a recipient of the physical object within the supply chain;
an object ID providing a unique ID for the physical object; and
an entity field identifying the corresponding entity;
the iterating further comprises confirming for each segment other than the first segment that the receiver fields match the entity field in an immediately preceding segment.

20. The non-transitory computer program product of claim 19, wherein the providing data comprises at least one of: displaying at least a portion of the data characterizing the iteration in an electronic visual display, transmitting at least a portion of the data characterizing the iteration to a remote computing system, storing at least a portion of the data characterizing the iteration into electronic physical persistence, or loading at least a portion of the data characterizing the iteration into memory.

* * * * *